United States Patent [19]

Ushijima et al.

[11] Patent Number: 4,902,076
[45] Date of Patent: Feb. 20, 1990

[54] ANTILOCK BRAKE CONTROL METHOD FOR MOTOR VEHICLE

[75] Inventors: Takayuki Ushijima; Katsumasa Igarashi; Seiichi Ishizeki; Hideki Ishido, all of Tokyo, Japan

[73] Assignee: Fuji Jukogyo Kabushiki Kaisha, Tokyo, Japan

[21] Appl. No.: 308,123

[22] Filed: Feb. 9, 1989

[30] Foreign Application Priority Data

Feb. 9, 1988 [JP] Japan .................................. 63-27948
Feb. 9, 1988 [JP] Japan .................................. 63-27949
Feb. 9, 1988 [JP] Japan .................................. 63-27950

[51] Int. Cl.⁴ .............................................. B60T 8/58
[52] U.S. Cl. ..................................... 303/100; 303/96; 303/98; 303/102; 303/103; 303/109; 364/426.02
[58] Field of Search .................................. 303/94–99, 303/100, 102, 110, 109, 103, 105, 106, 108, 111; 364/426.02, 426.01

[56] References Cited

U.S. PATENT DOCUMENTS

| | | | |
|---|---|---|---|
| 3,705,748 | 12/1972 | Ochiai ................................. | 303/109 |
| 4,758,053 | 7/1988 | Yasuno ............................ | 303/96 X |
| 4,762,375 | 8/1988 | Maki et al. ...................... | 303/104 X |
| 4,763,960 | 8/1988 | Uchida et al. ................... | 303/105 X |
| 4,797,825 | 1/1989 | Shimanuki et al. ............... | 303/96 X |
| 4,807,133 | 2/1989 | Shimanuki et al. .............. | 303/105 X |
| 4,824,184 | 4/1989 | Spadafora et al. ................. | 303/100 |
| 4,832,415 | 5/1989 | Shinomiya .......................... | 303/100 |
| 4,835,695 | 5/1989 | Walenty et al. ................ | 303/100 X |
| 4,836,619 | 6/1989 | Muto ................................. | 303/96 X |

*Primary Examiner*—Douglas C. Butler
*Attorney, Agent, or Firm*—Beveridge, DeGrandi & Weilacher

[57] ABSTRACT

In an antilock brake control for motor vehicles wherein a condition of locking of the wheels during braking is detected from the wheel speeds, and a control pattern of decreasing and reincreasing of the braking hydraulic pressure is repeated for carrying out effective braking operation, at least a phenomenon occurring in the vehicle in J-turn state is detected, and when the phenomenon exceeds a predetermined value, the antilock brake control is shifted from the normal mode to a J-turn mode in which different conditions are used. To detect the J-turn state, the difference in wheel speed between the right and left wheels is detected. Alternatively, lateral acceleration of the vehicle is also detected. Another alternative is a combination of the steering angle, the coefficient of friction between the wheels and the road surface, and the vehicle speed.

6 Claims, 5 Drawing Sheets

ANTILOCK BRAKE CONTROL METHOD FOR MOTOR VEHICLE

BACKGROUND OF THE INVENTION

The present invention relates to an antilock brake control method for motor vehicles.

In hydraulic braking systems of the prior art for motor vehicles, there have been proposed and demonstrated various types of antilock brake control devices in which the hydraulic pressure in the brake device is decreased in response to drop of the wheel speed when the brakes are applied to cause the braking hydraulic pressure to be supplied to the brake device for each wheel and the hydraulic pressure in the brake device is increased, and in which the hydraulic pressure is increased again after recovery of the wheel speed due to the decrease in hydraulic pressure in the brake device, and the same control pattern is repeated whereby effective braking operation can be accomplished. Such a type of antilock brake control device is disclosed in Japanese Patent Application Laid-Open Publication (KOKAI) No. 60-61354 published Apr. 9, 1985.

In the case of conventional antilock brake devices of the type described above, in response to wheel-speed signals delivered from wheel speed sensors provided for respective wheels, control is carried out for decreasing and reincreasing the braking hydraulic pressure. In practice, the hydraulic brake line system is formed as a dual brake line system in which two pairs of diagonally opposing wheels are connected to two independent brake lines, respectively, so that even in case of failure of one brake line, an emergency braking force can be produced by the other brake line. Generally, in this case, the lower wheel speed of the speeds of the two wheels connected to the same brake line is selected, and in response to the selected lower wheel speed, the braking hydraulic pressure control in that brake line is carried out so that all the wheels are prevented from locking.

However, in the case of J-turn (which is the state when a vehicle enters a curve at a speed in excess of a predetermined value and the driver makes a sharp turn and which is a state well known to those skilled in the art pertaining to the subject matter of the present invention), when the antilock brake device operates in the manner described above, the difference in wheel speed between the inner and outer wheels becomes large and the lateral acceleration is produced so that the inner wheels tend to rise up and the reaction forces from the surface of the road acting on the inner wheels are consequently decreased. As a result, the wheel speeds of the inner wheels are considerably decreased, and consequently the control for decreasing and increasing the braking hydraulic pressure is carried out mainly on the basis of the wheel speeds of the inner wheels. Then, since the reaction forces from the surface of the road acting on the inner wheels are low as described above, the wheel speeds are abruptly decreased in response to slight increase in the hydraulic pressure, and consequently the wheel are brought to a state in which the wheels are almost locked. Even when the hydraulic pressure is decreased under such conditions, it takes a long time for the wheel speeds recover, and the "no braking" mode (the hydraulic pressure is decreased) becomes longer. As a consequence, the braking force becomes insufficient as a whole, so that there arises the problem that the distance through which the vehicle travels after braking becomes longer than expected in an extremely dangerous state in which the brakes are abruptly applied in J-turn state, which seriously inhibits the safety drive.

SUMMARY OF THE INVENTION

In view of the above, the main object of the present invention is to provide an antilock brake control method which can substantially solve the above and other problems encountered in the conventional antilock brake control.

In the antilock brake control method of the type described above, the present invention is characterized in that at least a phenomenon occurring in the vehicle in a J-turn state thereof is detected, and that the antilock brake control of the braking hydraulic pressure is carried out under different conditions suitable for the J-turn state when the phenomenon is quantitatively in excess of the predetermined value.

The antilock brake control system detects the difference in wheel speed between the right and left wheels and the length of time during which the difference continues to exist, in order to detect the J-turn state.

Alternatively, the system detects lateral acceleration to the vehicle and the vehicle speed.

As another alternative, the system detects a combination of the steering angle, the coefficient of friction between the wheels and the road surface, and the vehicle speed.

DETAILED DESCRIPTION OF THE PREFERRED EMBODIMENTS

Preferred embodiments of the present invention will now be described hereinafter in detail with reference to the accompanying drawings.

Figure 1:
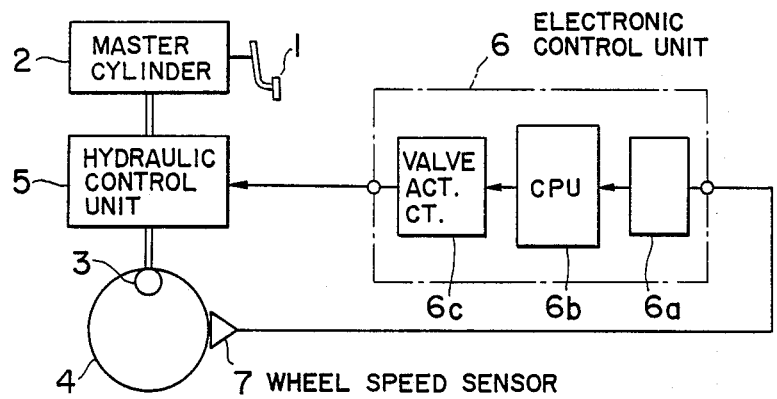
FIG. 1 is a schematic view illustrating the control system of an antilock brake control device according to the present invention.

FIG. 1 shows an antilock brake device to which the present invention is applied. A brake pedal 1 is operatively connected to a master cylinder 2. When the brake pedal 1 is depressed, the master cylinder 2 is actuated in the well known manner. Each wheel 4 is provided with a brake device 3. A hydraulic control unit 5 (to be referred to as "HU" in this specification hereinafter) is provided in the brake line from the master cylinder 2 to the brake device 3. The HU 5 comprises a hydraulic pressure holding valve 11 (shown in FIG. 12) for interrupting the supply of the hydraulic pressure from the master cylinder 2 to the brake device 3, a pressure reducing valve 12 (shown in FIG. 12) for permitting brake liquid in the brake device 3 to flow into a reservoir, and a pump (not shown) for supplying the brake fluid in the reservoir so as to supply it through an accumulator into the brake line from upstream thereof. In response to the output signal representative of the wheel speed of the wheel 4 detected by a wheel speed sensor 7, an electronic control unit 6 (to be referred to as "ECU" in this specification hereinafter) which comprises a pulse input circuit 6a connected to the sensor 7, a central processing unit 6b and a hydraulic valve actuating circuit 6c, generates signals for controlling the operations of the above-mentioned valves and pump so that the braking hydraulic pressure control is carried out in a manner to be described below in detail.

Figure 2:
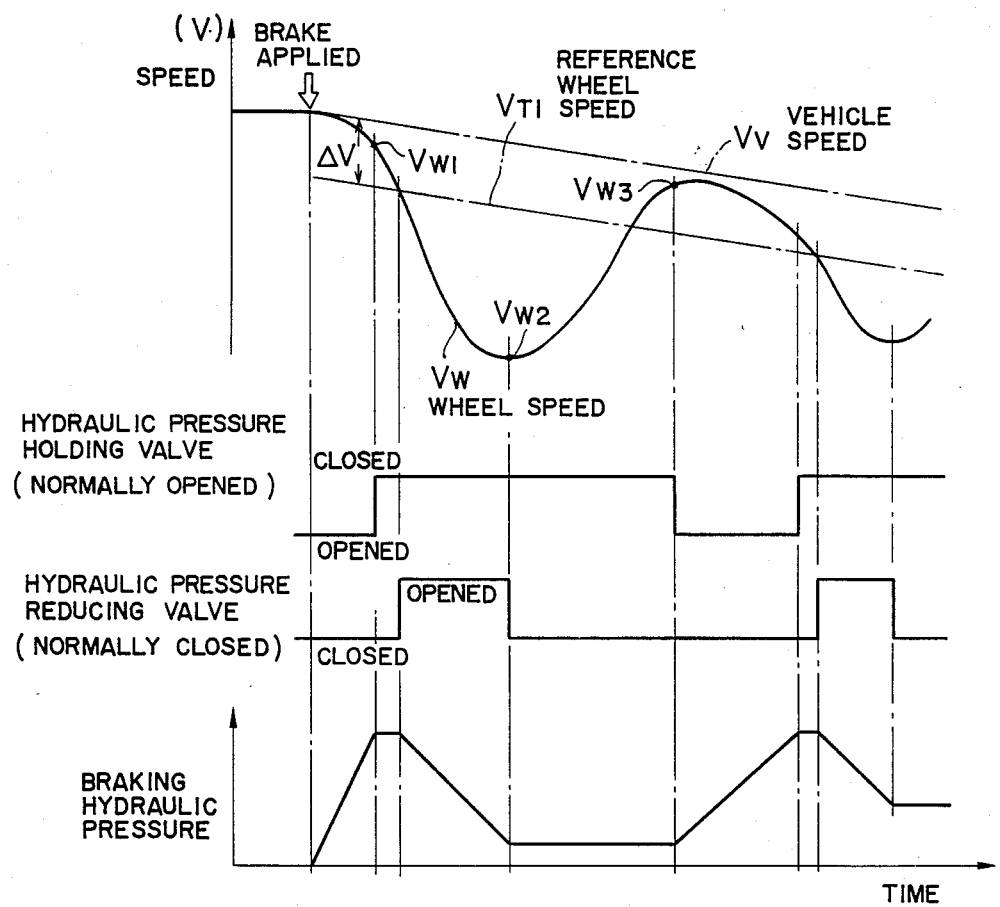
FIG. 2 is a graph explanatory of the mode of braking hydraulic pressure control during antilock brake control in normal driving condition.

As shown in FIG. 2, the pressure holding valve 11 is normally opened while the pressure reducing valve 12 is normally closed. When the brake pedal 1 is depressed to cause the master cylinder 2 to be actuated, the braking hydraulic pressure is supplied through the pressure holding valve 11 to the brake device 3 so that the hydraulic pressure in the brake device 3 rises. As the pressure in the brake device 3 is increased, a braking force is produced so that the speed $V_W$ of the wheel 4 is decreased. When the rate of decrease in hydraulic pressure detected by the sensor 7 drops below a predetermined value $V_{w1}$, the ECU 6 generates the holding signal so that the hydraulic pressure holding valve 11 is closed to interrupt the supply of the braking hydraulic pressure from the master cylinder 2 to the brake device 3 and the pressure in the brake device 3 is maintained at a value when the supply of the brake fluid thereto is interrupted.

During the hydraulic pressure holding mode described above, when the wheel speed $V_W$ drops below a predetermined value $V_{W1}$ as described above, the ECU 6 generates the opening signal in response to which the pressure reducing valve is opened so that the brake fluid in the brake device 3 flows into the reservoir, whereby the pressure in the brake device 3 is decreased.

The brake fluid that has flowed in the reservoir, is stored in the accumulator by the pump.

When the pressure in the brake device 3 is decreased in the manner described above, the speed $V_W$ of the wheel is gradually recovered due to the reaction force from the surface of the road to approach the vehicle speed $V_V$. When the wheel speed $V_W$ has recovered to a predetermined value $V_{W3}$, the ECU 6 generates the opening signal in response to which the pressure holding valve is opend. As a result, the brake fluid which has been supplied by the pump and accumulated in the accumulator is supplied through the hydraulic pressure holding valve 11 to the brake device 3 so that the pressure in the brake device 3 rises to decrease the wheel speed. Thereafter, the above-described operation for decreasing the pressure and then increasing it again is repeated so that the brakes can be applied very effectively with a predetermined rate of decrease in the vehicle speed without causing the lock of the wheels.

Selecting the highest speed of the wheel speeds of the four wheels (i.e., the right and left front wheels, the right and left rear wheels), the ECU 6 calculates the vehicle speed $V_V$ and then determines a reference wheel speed $V_{T1}$ which is lower than the calculated vehicle speed $V_V$ by a predetermined value $\Delta V$ or a predetermined ratio. The reference wheel speed $V_{T1}$ is used as a reference value below Which the pressure reducing valve 12 is opened. The ECU 6 also determines a starting point $V_{W2}$ at which the decrease in the wheel speed $V_w$ is changed to the increase in response to the opening of the pressure reducing valve 12; for example, the starting point $V_{W2}$ at which the wheel speed $V_W$ recovers by a predetermined ratio with respect to the difference between the vehicle speed and the wheel speed at the lowest point. At this point, the pressure reducing valve 12 is closed while the pressure holding valve 11 is opening so that the hydraulic pressure is decreased. As described above, the control timings for decreasing the hydraulic pressure and for reincreasing it are determined simultaneously in dependency on the vehicle speed $V_V$ calculated from the highest wheel speed and the reference wheel speed $V_{T1}$.

Figure 3:
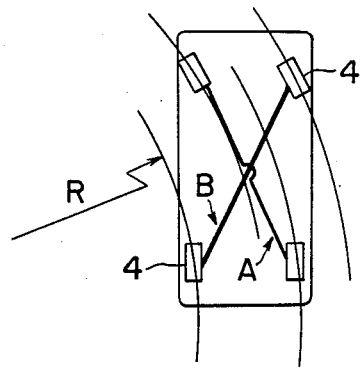
FIG. 3 is a view explaining the loci of the paths of the wheels in the J-turn state.

In FIG. 1, the antilock brake control system only for one wheel is illustrated, but, in practice, the brake lines extending from the master cylinder 2 to the brake devices 3 of the wheels 4 are divided into two independent brake lines A and B as shown in FIG. 3. That is, the left front wheel and the right rear wheel are connected to one brake line A while the right front wheel and the left rear wheel are connected to the other brake line B which is separate from said first-mentioned brake line A. One HU 5 is connected to each brake line so that the hydraulic pressure control for the two wheels which belong to the same brake line is carried out by the same HU 5. The ECU 6 selects the lower wheel speed of the speeds of the two wheels connected to the same brake line, and, in response to the lower wheel speed and the vehicle speed $V_V$, the ECU determines the timings for decreasing and increasing the braking hydraulic pressure in the two brake devices 3 of the two wheels which belong to the same brake line, and produces command signals. Thus, the ECU ensures antilock braking operation that never causes the wheels to lock.

However, when the antilock brake control in the normal mode described above is carried out in J-turn state, various disadvantages occur.

Figure 4:
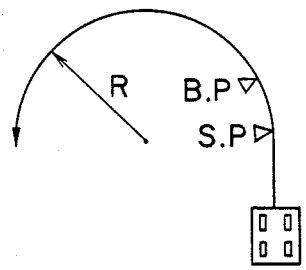
FIG. 4 is a view for explaining the J-turn state.

That is, as shown in FIG. 4, when the driver abruptly applies the brake at the point SP in the J-turn state, in which the vehicle enters a curve at a speed higher than a predetermined value, and the vehicle makes a sharp turn at the point SP, not only is there an increase in the error of the vehicle speed obtained by the computation of the actual wheel speed, due to the difference in locus of path between the inner and outer wheels, but also the speeds of the inner wheels decrease faster than those of the outer wheels at the early stage of the braking operation due to the reduction of reaction force acting on the inner wheels from the surface of the road. As a result, the pressure in the hydraulic brake line decreases at a relatively low braking pressure and in such a pressure decrease mode wherein it takes a long time before the inner wheel speeds recover to reach the preset value $V_{W3}$ due to the decrease of the reaction force from the road surface so that the pressure decrease mode is increased in time and the effectiveness of the braking operation is lowered than in the normal mode.

The present invention therefore provides a method for detecting whether or not the vehicle is in a J-turn state in a simple and reliable manner. According to the control method of the present invention, when the ECU 6 determines that the vehicle is in the J-turn state, the reference wheel speed in the normal mode at which the braking hydraulic pressure is decreased and then increased again is switched to another reference wheel speed for J-turn mode corresponding to the J-turn state whereby effective braking operation can be carried out.

Figure 5:
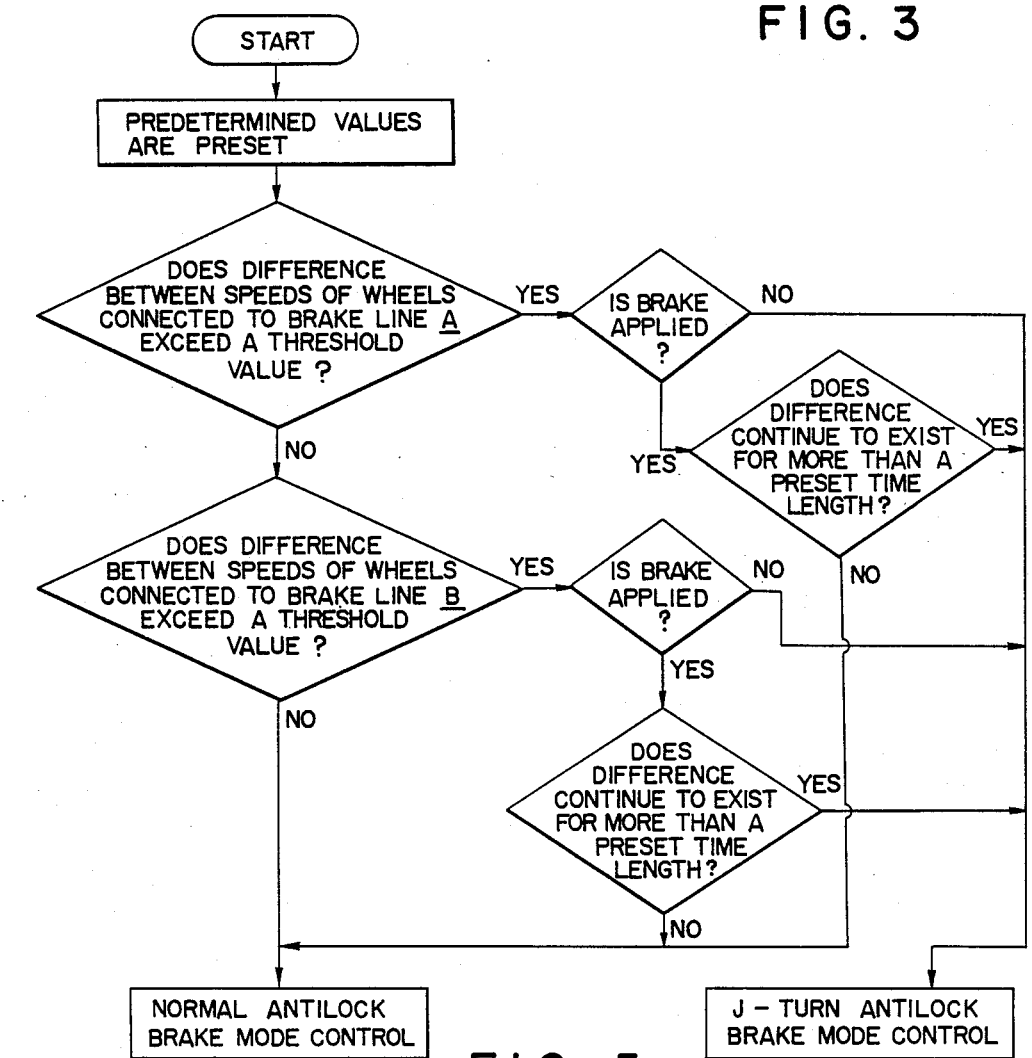
FIG. 5 is a flow chart illustrating a preferred embodiment of the present invention.

That is, in case of the J-turn state, since the loci of trailing paths of the right and left front wheels and the right and left rear wheels are different from each other as shown in FIG. 3, the difference in wheel speed between the inner and outer wheels is increased. Therefore, as shown in FIG. 5, the speeds of the four wheels are detected, and the ECU calculates the difference in wheel speed between the diagonally opposing left front wheel and right rear wheel and the difference between the diagonally opposing right front wheel and left rear wheel. Then, when the differences in the speeds of the wheels which belong to both the brake lines A and B become larger than a threshold value prior to the application of brakes, it is determined that the vehicle is in a first condition of J-turn state. When the differences do not exceed the threshold value, the antilock brake control system is operated in the normal antilock brake mode.

Assume that the vehicle is driving straight and the driver applies brake. At this time, if the coefficient of friction between the right side wheels and the road surface and the coefficient of friction between the left side wheels and the road surface are widely different from each other on a road, the difference in wheel speed between the right and left wheels tends to become larger. In this case, it is impossible to detect whether the vehicle is in J-turn state or whether it is travelling on a road having different frictions on the left and right sides thereof.

Therefore, when J-turn is made after the brakes are applied, it is detected whether or not the condition that the wheel speed difference exceeds a threshold value continues for more than a predetermined time length (for instance 200 msec), and it is determined that the vehicle is in J-turn state when the above-mentioned condition continues for a predetermined time. When the brakes are applied on the road which has different coefficient of friction between the left and right sides, the decrease and increase in pressure repeat by the antilock brake control so that the wheel speed is increased and decreased accordingly. Therefore, the wheel speed difference between the left and right side wheels is largely increased or decreased, and the wheel speed difference which exceeds the threshold value will never continue for a long period of time. As a result, it can be correctly determined that the vehicle is in the J-turn state while the brakes are applied.

When the brakes are applied before the vehicle is turned, the braking effect can be already obtained prior to the turning of the vehicle so that it is regarded that the vehicle speed has already been considerably decreased and it is therefore determined that the vehicle is not in the J-turn state.

Figure 6:
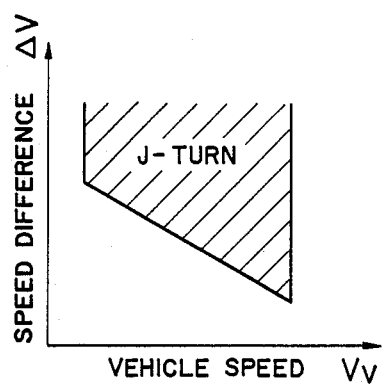
FIG. 6 is a view illustrating one example of the threshold value of the wheel speed difference which is used to determine whether or not a motor vehicle is in the J-turn state.

As shown in FIG. 6, the threshold values are set as a function which decreases with the increase in the reference vehicle speed (the quasi-body speed $V_V$ obtained by the computation based on the actual wheel speed in the manner described above). It is preferable that the threshold value of the wheel speed difference is 7 to 8 Km/H when the vehicle speed is low, and the threshold value is 2 to 3 Km/H when the vehicle speed is high.

When the ECU 6 determins that the vehicle is in the J-turn state in the manner described above, one way to operate the antilock brake control in the J-turn mode is that not only a predetermined reference wheel speed $V_{T1}$ but also a predetermined wheel speed $V_{W2}$ are decreased to a lower value of the wheel speed than that of the normal mode. The above speed $V_{T1}$ means the speed at which the pressure reducing valve is opened, while the above speed $V_{W2}$ means the speed at which the pressure reducing valve is closed while the hydraulic pressure holding valve is opened to increase braking hydraulic pressure again. Another way to operate the antilock brake control is to change to a mode in which the computation method for obtaining the reference vehicle speed for the antilock brake control is changed to decrease the reference vehicle speed $V_V$. Thus, the hydraulic pressure decreasing mode is shortened; the effective brake operation is enhanced; and the brake stopping distance is shortened.

As described above, according to the embodiment of the present invention, the J-turn state of the vehicle can be correctly detected by simple techniques, and the antilock brake control for automotive vehicles can be switched to the best mode which are desirable for J-turn state so that the safety in J-turn state can be remarkably enhanced.

Figure 7:
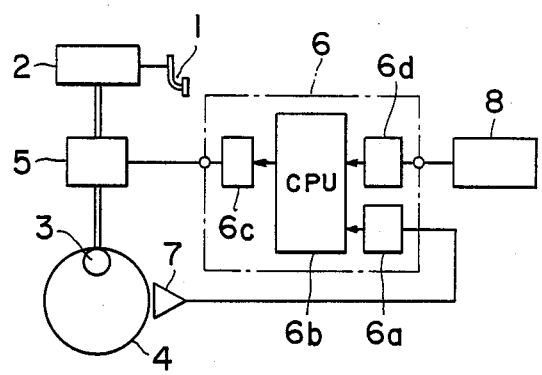
FIG. 7 is a view which is similar to FIG. 1 but illustrating the control system of an antilock brake device used for carrying out a second embodiment of the present invention.
Figure 8:
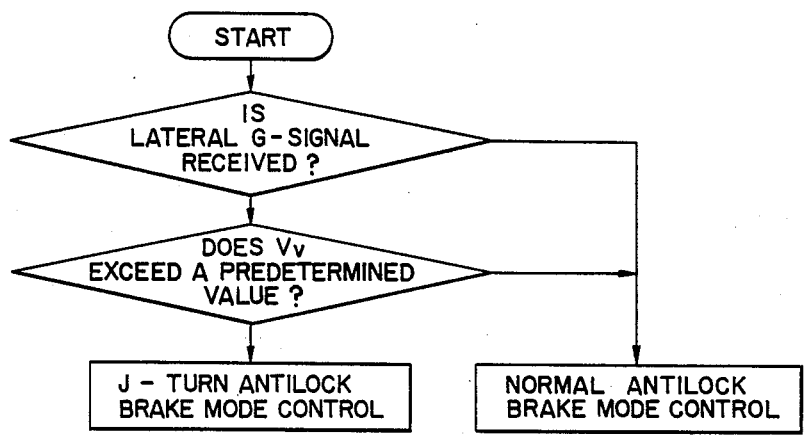
FIG. 8 is a flow chart illustrating the second embodiment.
Figure 9:
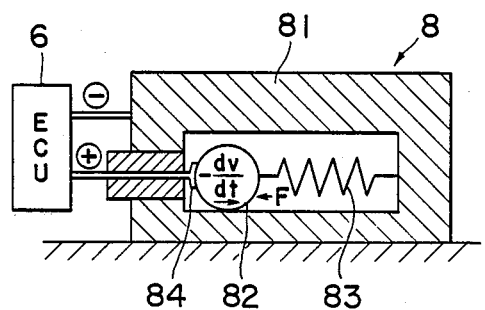
FIG. 9 is a sectional view showing an example of a lateral G-sensor used in the system of FIG. 7.

In FIGS. 7, 8 and 9, another embodiment of the present invention is shown. In this embodiment, the determination of the J-turn state is made by means of a lateral G-sensor 8 shown in FIG. 7, which detects lateral acceleration of the vehicle and delivers a signal to the ECU 6 when lateral acceleration becomes larger than a predetermined value (for instance, of the order of 0.6 g). As shown in the flow chart of FIG. 8, when lateral acceleration becomes larger than the predetermined value, the vehicle is determined to be in the J-turn state, and the control proceeds to the J-urn control mode as shown in FIG. 8. At that time, whether or not the vehicle speed $V_V$ (See FIG. 2) computed from the wheel speed exceeds the predetermined value (for instance, of the order of 30 Km/H) is also detected. That is, the ECU 6 calculates that the lateral acceleration exceeds the predetermined value and the vehicle speed is also higher than the predetermined speed.

The lateral-G sensor 8 has a construction, for instance, as shown in FIG. 9. A ball-shaped movable contact 82 having a mass M is loosely fitted into a case 81 mounted on the motor vehicle in such a way that the movable contact 82 is movable in the lateral direction of the vehicle. A coil spring 83 is loaded for biasing the movable contact 82 in one direction (to the left in the figure) so that the contact 82 is normally in contact with a stationary electric contact 84 securely attached to the case 81 under the force of the spring 83. Two sensors 8 with the above-described construction are securely mounted on the vehicle n both sides thereof, respectively, in symmetrical relationship with each other with respect to the centerline of the vehicle.

The force pushing the movable contact 82 to the left by the spring 83 is represented by F and its initial setting force is represented by Of. Then when lateral acceleration $-dv/dt$ is produced to act on the vehicle to the right and when the force $-dv/dt \cdot M$ forcing the movable contact 82 to the right by the above-mentioned lateral acceleration is smaller than the initial setting force Fo of the spring 83 (that is, $-dv/dt \cdot M + Fo > 0$), the movable contact 82 remains in contact with the stationary contact 84. That is, the sensor 8 remains in the ON state.

When $-dv/dt \cdot M$ becomes greater than Fo ($-dv/dt \cdot M + Fo < 0$), the movable contact 82 compresses the spring 83 and the contact 82 moves to the right and is balanced under the force F. Therefore, the movable contact 82 is moved away from the stationary contact 83 so that the sensor 8 is switched into the OFF state and generates an OFF signal so that it can be determined that lateral acceleration has become greater than a predetermined value.

Referring again to FIG. 8, whether or not the vehicle speed exceeds a predetermined value may be detected in dependency on the vehicle speed data from the speedometer generally mounted on the vehicle. But since, as described above, the ECU 6 is always computing the reference vehicle speed $V_V$ in response to the wheel speed signal delivered from the speed sensor 7, it is the simple method to use this reference vehicle speed $V_V$ in order to detect whether or not the vehicle speed is exceeds a predetermined value.

When the vehicle is determined to be in the J-turn state in the manner described above by the ECU 6, the antilock brake control is switched to the antilock brake control mode for the J-turn state. That is, the preset wheel speed and the preset wheel speed become lower than that of the normal mode. At that time, the pressure reducing valve 12 is opened, and the pressure reducing valve 12 is closed while the pressure holding valve 11 is opened so as to increase the hydraulic pressure again. Alternatively, the computation method for obtaining the reference vehicle speed is changed so that the vehicle speed $V_V$ which is used as a reference for the antilock brake control in the J-turn state is decreased. Therefore, the time during which the braking hydraulic pressure is decreased is shortened; the effective braking is applied; and the distance through which the vehicle travels after braking can be shortened.

It is to be understood that the lateral G-sensor 8 is not limited to the sensor shown in FIG. 9 and that any suitable conventional G-sensors may be used.

Figure 12:
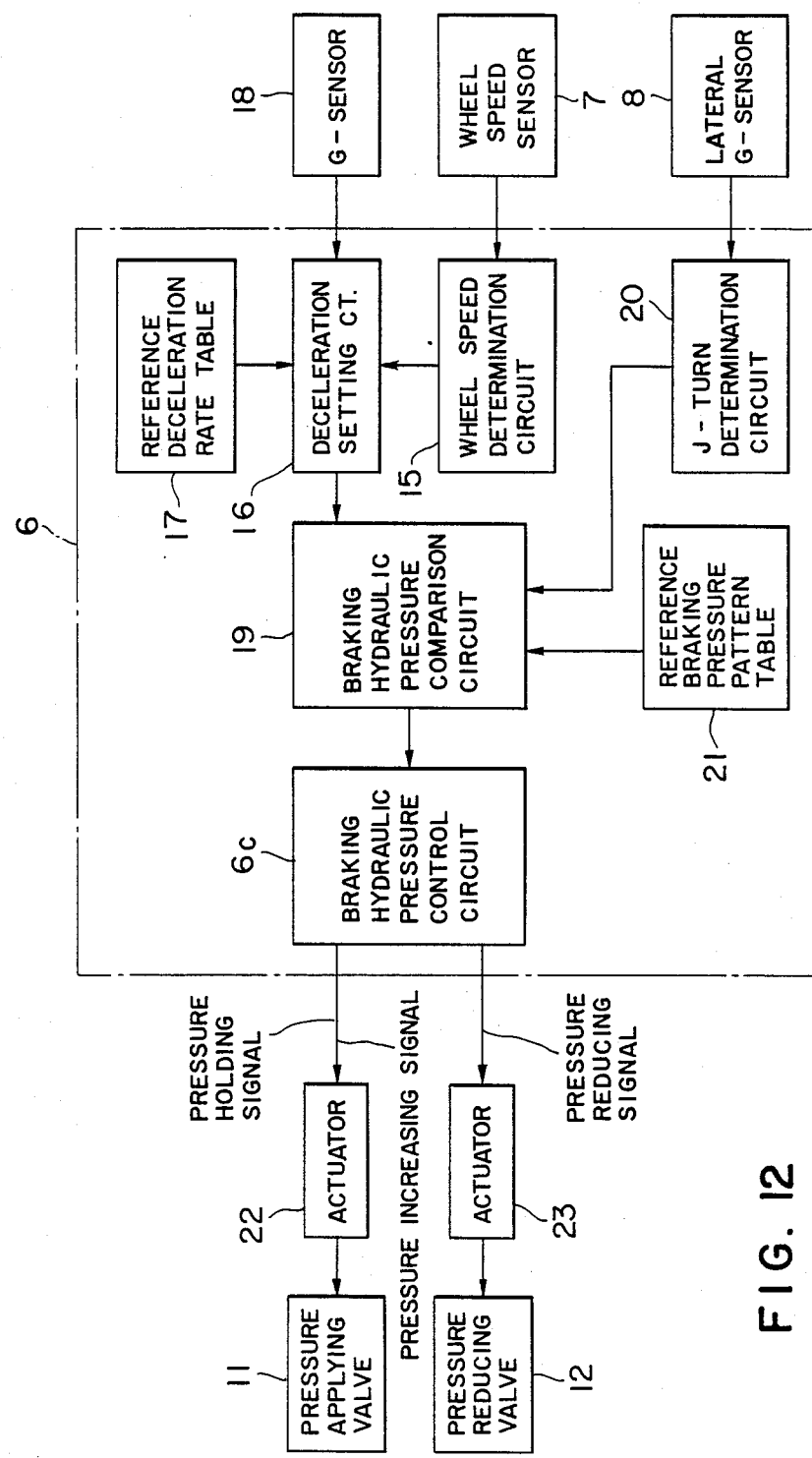
FIG. 12 is a schematic diagram of the antilock brake control system.

FIG. 12 illustrates in detail an example of the ECU 6. The wheel speed signal is provided from the wheel speed sensor 7 to a wheel speed determination circuit 15. The circuit 15 delivers its output to a deceleration setting circuit 16, in which the wheel speed is compared with a reference deceleration rate table 17 and the rate of deceleration is set. A G-sensor 18 which detects acceleration in the front-to-rear direction of the vehicle delivers its output to the circuit 16. The output of the deceleration setting circuit 16 is provided to a braking hydraulic pressure comparison circuit 19. The lateral G-sensor 8 is connected to a J-turn determination circuit 20. When it is determined that there is a J-turn state, the J-turn determination circuit 20 puts out a signal to the braking hydraulic pressure comparison circuit 19, whereby the normal control mode is changed to the J-turn control mode. The input signal to the comparison circuit 19 from the deceleration setting circuit 16 is compared with a reference braking pressure table 21, and resulting signal is inputted to the braking hydraulic pressure control circuit 6c. Thereafter, the circuit 6c controls the hydraulic pressure via actuators 22 and 23.

Figure 10:
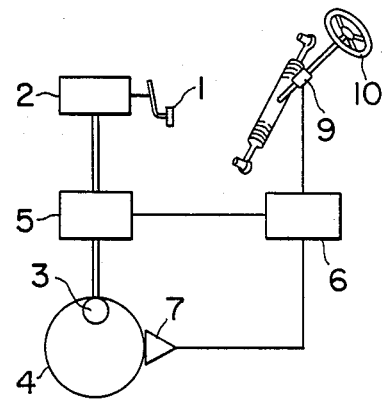
FIG. 10 is a view which is similar to FIG. 1 but illustrating the control system of an antilock brake device used for carrying out a third embodiment of the present invention.
Figure 11:
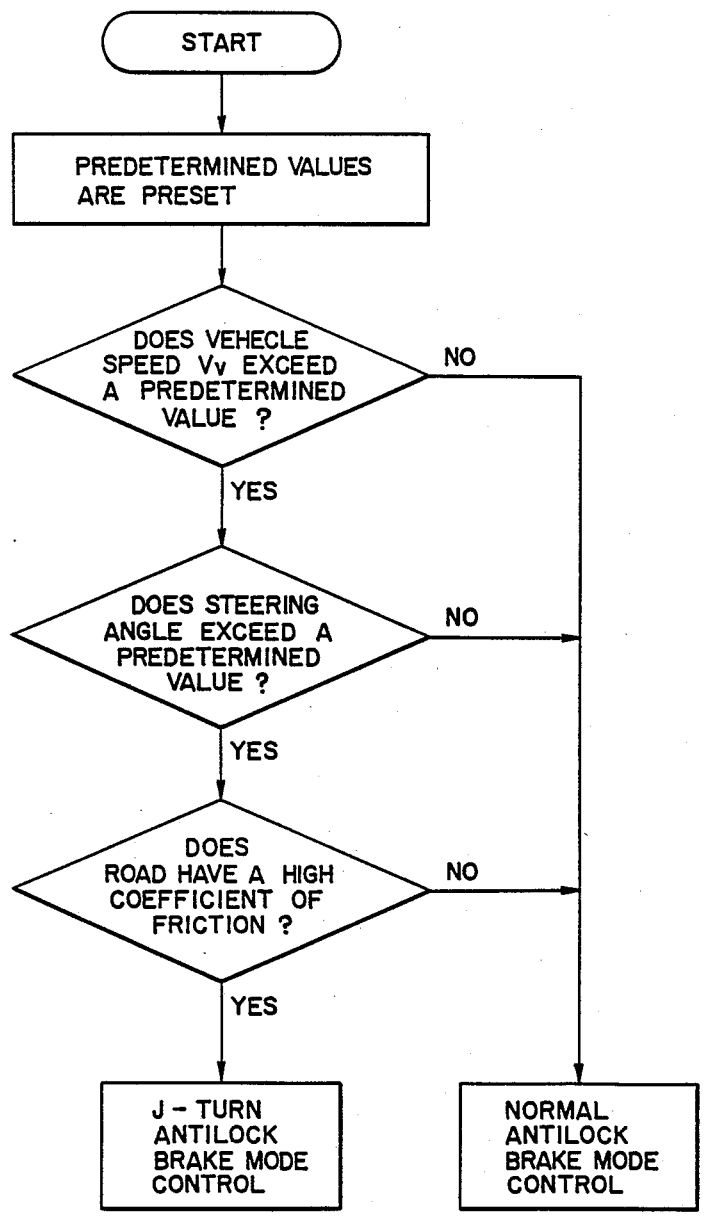
FIG. 11 is a flow chart illustrating the third embodiment.

FIGS. 10 and 11 show another embodiment of the present invention wherein a sensor 9 for detecting the turning angle of the steering wheel 10 is used and turning angle signals are provided from the sensor 9 to the ECU 6 as shown in FIG. 10.

When the vehicle speed $V_V$ is detected to exceed a predetermined value (for instance, 30 Km/H), the steering angle detected by the sensor 9 exceeds a predetermined value (for instance, of the order of 90°), and the coefficient of friction between the wheels and the surface of the road which is detected by a method described below exceeds a predetermined value (for instance, of the order of 0.6), the ECU 6 determines as shown in FIG. 11 that the vehicle is in the J-turn state, and the control mode is switched from the normal mode to the J-turn mode adapted for the J-turn state, whereby the antilock brake control is carried out in the J-turn mode.

The determination of the J-turn state is made according to the lateral acceleration computed from only the vehicle speed and the steering angle, in such a manner that the vehicle is in the J-turn state when the computed lateral acceleration exceeds a predetermined value. However, when the vehicle is running on the road with a low coefficient of friction and is steered through a large angle, the wheels lip to such an extent that the radius of turning corresponding to the steered angle cannot be obtained and therefore lateral acceleration actually produced is considerably lower than the above-described estimated lateral acceleration, so that the vehicle is not in the J-turn state in which the difference in wheel speed between the inner and outer wheels becomes greater and the reaction forces from the road surface acting on the inner wheels are considerably decreased. Therefore, as described above, when the vehicle speed and the steering angle both exceed their predetermined values, and, in addition, the road on which the vehicle runs has a high friction coefficient which is higher than the a predetermined value, the vehicle is determined to be in the J-turn state, according to this embodiment.

As described above, the ECU 6 is always computing a reference vehicle speed $V_V$ in dependency on the wheel speed signal received from the wheel speed sensor 7, so that the detection of whether or not the vehicle speed is higher than a predetermined value can be made easily.

The coefficient of friction of the road can be obtained by the following computation. That is, as described above, the ECU 6 is always computing a reference vehicle speed $V_V$ based on the wheel speed which is the highest of the wheel speed signals received from the wheel speed sensors 7. Meanwhile, when the brakes are applied, the reaction forces from the surface of the road act in such a direction as to cause the wheels to rotate against the braking force., so that the lower the cofficient of friction of the surface of the road is, the greater the decrease in wheel speed becomes when the brakes are applied and the drop of the reference vehicle speed $V_V$ obtained by the computation described above also becomes greater. Therefore computation of the rate of the decrease in the vehicle speed $V_V$ per unit of time during braking makes it possible to determine whether or not the coefficient of friction of the surface of the road exceeds a predetermined value without the need of special sensors or the like.

When the ECU 6 has determined that the vehicle is in the J turn state in the manner described above, the antilock brake control is switched to the J-turn mode from the normal mode.

What is claimed is:

1. In an antilock brake control method for motor vehicles, comprising the steps of:

detecting an actual wheel speed of each wheel of a vehicle by means of a wheel speed sensor;
 setting a reference vehicle speed by computation of the wheel speed;
 determining a reference wheel speed which is lower than the reference vehicle speed;
 determining that the wheel is to lock when the actual wheel speed becomes a predetermined value below said reference wheel speed as a result of braking operation;
 decreasing braking hydraulic pressure acting on the wheel, when the actual wheel speed becomes a predetermined value below the reference wheel speed, to allow the actual wheel speed to increase due to the reaction force from the road surface;
 reincreasing braking hydraulic pressure when the actual wheel speed exceeds said reference wheel speed to indicate that the actual wheel speed recovers to a sufficient speed; and
 carrying out control of the braking hydraulic pressure by decreasing and increasing the pressure in dependency on the reference wheel speed:
 the improvement comprising the steps of:
 detecting at least a phenomenon occurring in the vehicle in a J-turn state thereof;
 determining whether or not the phenomenon is exceeds a predetermined value; and
 carrying out the control of the braking hydraulic pressure under another antilock brake control condition for the J-turn state when the phenomenon exceeds the predetermined value.

2. The improvement as claimed in claim 1, wherein the difference in wheel speed between right and left wheels of the vehicle is detected, and when the difference exceeds a threshold value, it is determined that the vehicle is in the J-turn state, and wherein the control of the braking hydraulic pressure for the J-turn state is carried out upon determination of the J-turn state.

3. The improvement as claimed in claim 1, wherein the difference in wheel speed between the right and left wheels of the vehicle is detected, and when the difference exceeds a threshold value while the brakes are applied and when the difference continues to exist for a predetermined length of time, it is determined that the vehicle is in the J-turn state, and wherein the control of the braking hydraulic pressure for the J-turn state is carried out upon determination of the J-turn state.

4. The improvement as claimed in claim 1, wherein the threshold value of the difference in wheel speed is reduced as the reference vehicle speed increases.

5. The improvement as claimed in claim 1, wherein lateral acceleration imparted to the vehicle is detected, and when the lateral acceleration thus detected is larger than a predetermined value and when the vehicle body speed exceeds a predetermined value, it is determined that the vehicle is in the J-turn state, and wherein the control of the braking hydraulic pressure for the J-turn state is carried out upon determination of the J-turn state.

6. The improvement as claimed in claim 1, wherein steering angle of the front wheels and the coefficient of friction between the wheels and the road are detected, and when the vehicle speed exceeds a predetermined value, the steering angle which exceeds a predetermined value, and furthermore the coefficient of friction which exceeds a predetermined value, it is determined that the vehicle is in the J-turn state, and wherein the control of the braking hydraulic pressure for the J-turn state is carried out upon determination of the J-turn state.

* * * * *